Sept. 16, 1952 — L. F. HOPE — 2,610,505
NONSEISMIC TORSIOGRAPH
Filed March 18, 1949

Inventor
Lawrence F. Hope
By Spencer, Willits, Helwig & Baillie
Attorneys

Patented Sept. 16, 1952

2,610,505

UNITED STATES PATENT OFFICE 2,610,505

NONSEISMIC TORSIOGRAPH

Lawrence F. Hope, Grosse Pointe Farms, Mich., assignor to General Motors Corporation, Detroit, Mich., a corporation of Delaware Application March 18, 1949, Serial No. 82,220

3 Claims. (Cl. 73—68)

The present invention relates to means for measuring torsional vibration frequency and amplitude. More particularly it relates to nonseismic means for measuring these quantities.

Torsional vibration is not a new problem and engineers have previously developed instrumentation for measuring this type of vibration under certain conditions. Most torsiographs however depend on a seismic mass or an electrical circuit giving equivalent results in determining torsional vibration frequency and amplitude. Such measuring instruments have two inherent limitations, one being minimum vibration frequency and the other being maximum vibration amplitude. It would, for example, be quite difficult to design a conventional type instrument capable of measuring torsional oscillations having an amplitude of 20 degrees with a frequency of .5 cycle per second. Conventional torsiographs have either mechanical or electrical stops which must be sufficiently spaced to include the greatest amplitude of torsional angular deviation. The spacing of these stops must be increased beyond the torsional oscillation range sufficiently to prevent their being encountered during a cycle of random speed variation. The random engine speed variation occurring at frequencies in the range of .5 cycle per second can be quite large. A conventional design torsiograph with sufficient range to include this high random speed variation is quite insensitive to small torsional oscillation amplitudes. These are of course not usual conditions but are considered to be those which may be met when it is necessary to investigate non-linear coupling resonance occuring below the idle speed of an internal combustion engine.

It is therefore an object of the present invention to produce a torsional vibration measuring instrument capable of responding to angular velocity deviations of low frequency and high amplitude.

It is a second object of the present invention to produce a torsional vibration measuring instrument requiring no seismic mass.

It is a third object of the present invention to produce a torsiograph which is simple in operation and accurate in results.

It is a further object of the present invention to provide a torsiograph which will operate satisfactorily over a large range of mean speeds with a minimum of correction for mean speed.

It is a still further object of the present invention to provide a torsiograph the output signal of which is proportional in amplitude and equal in frequency to the torsional vibration of the mass under investigation.

Other objects of the present invention will become apparent upon reading of the specification and inspection of the drawing and will be specifically pointed out in the claims.

Referring to the drawing.

Figure 1:
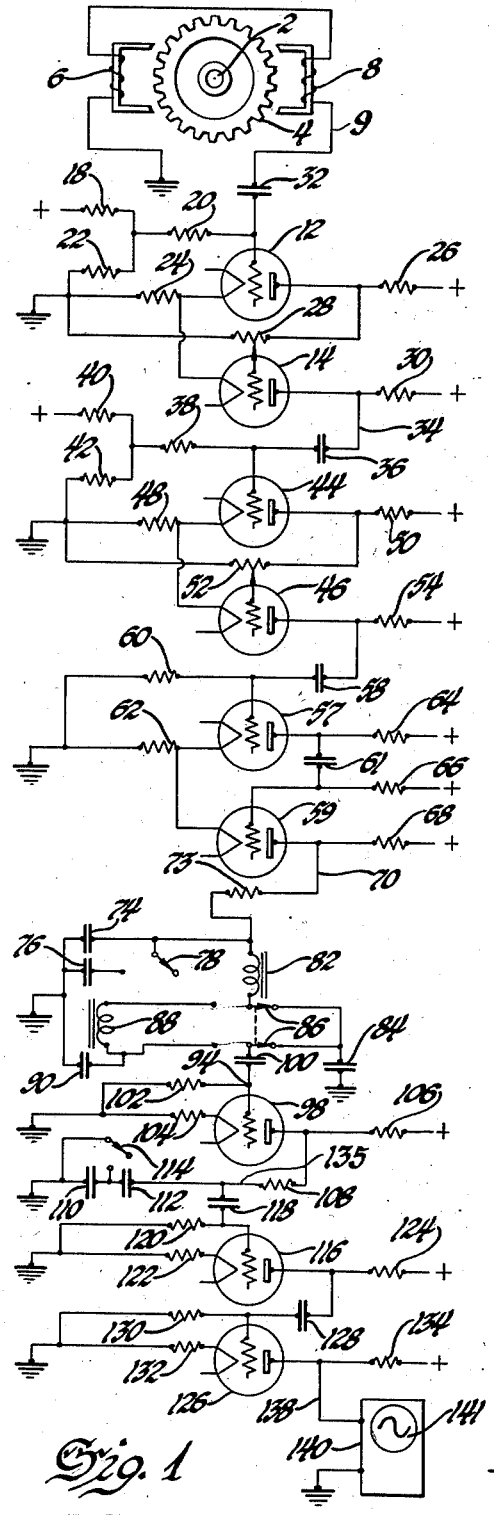
Figure 1 is a schematic showing of the present invention.

Referring more particularly to Figure 1, 2 is a shaft the torsional vibration characteristics of which it is desired to determine. Rigidly secured to that shaft is a gear type signal generator 4. The gear in this generator is subject to all the torsional vibration and other physical movements of the shaft 2 occurring at the point to which the gear is secured. Pickup coils 6 and 8 are mounted in stationary relation to the frame in which the shaft 2 rotates. These two pickup coils are located diametrically opposite each other and generate sinusoidal signals in aiding phase at gear tooth passage frequency. The purpose of using two pickups is to minimize the effect of gear wobble in a plane normal to the axis of rotation. Each time a gear tooth passes the pole of pickups 6 and 8, one cycle of alternating voltage is generated. A signal 10 is thereby generated and applied at point 9 of frequency equal to the number of teeth on the gear times the rotational frequency of the shaft 2. This carrier signal 10 is phase modulated by torsional vibration. It is operated upon electrically as will be described later to produce a voltage proportional to this gear tooth passage frequency. An integration of this voltage yields a signal output voltage which is proportional to vibration amplitude.

Referring more particularly to the circuit, the combined signal output 10 of the pickups 6 and 8 is fed into an overdriven amplifier circuit including tubes 12 and 14, resistors 18, 20, 22, 24, 26, 28 and 30 and condenser 32 to produce a square wave 16. The square wave 16 is of constant amplitude and equal in frequency to the frequency of the pickup output signal 10. This signal is produced by standard electronic methods as will be noted from the circuit.

Figure 2:
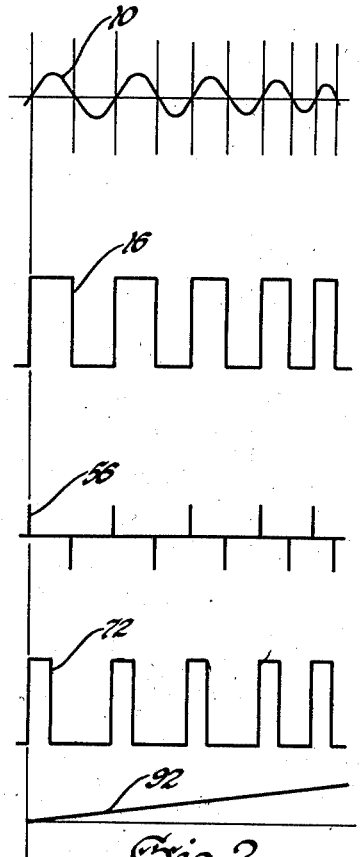
Figure 2 shows wave forms at various points in the circuit illustrated in Figure 1.
Figure 3:
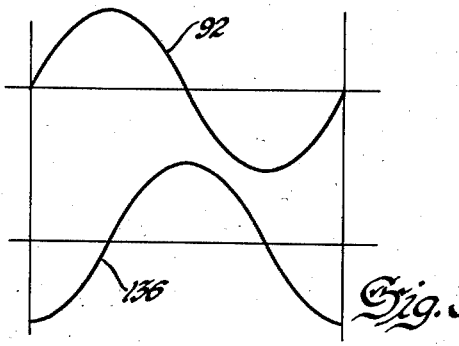
Figure 3 shows certain wave forms on a different time scale than Figure 2.

The signal 16 which appears at the point 34 is fed into a differentiating circuit including condenser 36 and resistors 38, 40, and 42 to produce positive pips at the beginning of each square wave cycle 16. This circuit also produces negative pips at the end of each square wave cycle but the negative pips are not used and are of no importance in the present invention. The pips are amplified by an amplifier including tubes 44 and 46 and resistors 48, 50, 52 and 54 to produce positive potential pips 56 of sufficient amplitude to trigger a constant energy pulse square wave generator of the one shot multivibrator type. This circuit includes tubes 57 and 59, coupling condensers 58 and 61 and resistors 60, 62, 64, 66 and 68. The tube 59 is normally conducting but, upon energization by the positive pips 56 applied to tube 57, the tube 59 is made non-conducting for a fixed period of time after which it returns to its conducting state. The output at the point 70 therefore consists of constant energy pulses 72 spaced from each other an amount proportional to the wave length of the signal 10 or inversely to the frequency of this signal and the instantaneous angular velocity of the shaft 2. The resultant wave formed by the train of constant energy pulses actually contains three components: (1) a D. C. voltage which is proportional to the steady speed of the gear generator which is unwanted; (2) a slow A. C. voltage which is proportional to velocity fluctuations and which provides the desired signal and is derived from a variation of the D. C. voltage above and below said steady speed; and (3) a higher frequency A. C. due to the pulses 72 themselves which is also unwanted. Provision is, therefore, made to remove the D. C. and higher frequency A. C. and utilize the signal whose amplitude is proportional to torsional vibration amplitude; that is, proportional to the instantaneous angular displacement of shaft 2 from its normal angular position with uniform rotation which is obtained from the slow A. C. voltage. In order to remove the higher frequency A. C. from this resultant signal, the constant area pulses are first passed through a low pass filter circuit including resistor 73 and condenser 74 (or condensers 74 and 76 depending upon the position of the range switch 78). Choke coil 82 and condenser 84 are utilized with the switch 86 in the position shown. If the switch is placed in the position opposite to that here shown, the choke coil 82 is combined with choke coil 88 and condenser 90 to produce this filtering action. The direct current component of this signal is now removed by coupling condenser 100. There now remains only the slow or low frequency A. C. which is transmitted through condenser 100 and which produces a signal 92 at the point 94 as shown in Figures 2 and 3 on a reduced time scale. The signal 92 has a frequency equal to the frequency of the torsional vibration oscillations. The amplitude of the signal is a function of the instantaneous angular velocity of the gear generator 4. If the pulses 72 occur closer together, then the slow A. C. voltage will be higher or of greater amplitude, whereas if they are spaced farther apart the A. C. voltage will be less, and it is this change in spacing of the pulses 72 on the horizontal base line caused by torque vibrations that provides the slow A. C. and the signal 92, which has a frequency equal to the frequency of the torsional vibrations. Thus, as the pulses 72 in Figure 2 become more closely spaced at the right, the curve 92 acquires a higher amplitude which will reach a maximum when the pulses 72 are closest together and then start to diminish as the pulses begin to widen in spacing, which compression and widening occur cyclically at the frequency of the torsional vibrations. The other A. C. and D. C. components of the wave train have at this point been removed. If, for the purpose of discussion, we assume the torsional vibration is sinusoidal, the signal amplitude is a function of both frequency and amplitude of torsional oscillation. The amplitude of the fluctuation or A. C. component of the signal may be represented as:

Instantaneous amplitude of signal $92 = x\theta \cos \theta t$
$\theta$ in radians per sec. = 6.2832 times the torsional vibration frequency, in cycles per sec.
$x$ = constant depending on electrical design of circuit and on vibration amplitude
$t$ = time in seconds It is quite desirable that the amplitude of the signal viewed be insensitive to frequency and a function of only the torsional oscillation amplitude. This transformation may be accomplished by integrating the signal 92 with respect to time after amplifying this signal by an amplifier including tube 98 and plate load resistor 106. This amplifier increases the amplitude of the signal 92 sufficiently for it to be accurately integrated.

The signal after amplification is then integrated by means of integration circuit including resistor 108 and condensers 110 and 112. The condenser 110 may be shorted out by a switch 114 if desirable to change the working frequency range.

Instantaneous amplitude of signal 136 at the point 135
$$= \int x\theta \cos \theta t \, dt$$
$$= x \sin \theta t$$

It may thus be seen that the peak amplitude of the signal 136 is insensitive to frequency and directly proportional to torsional vibration amplitude as was desired. This signal 136 is fed into an amplifier including tube 116, coupling condenser 118 and resistors 120, 122 and 124. The output of this amplifier is fed into a second amplifier having tube 126, coupling condenser 128 and resistors 130, 132 and 134 to produce a signal 141 at the point 138 proportional to the signal 136 and one which is equal in frequency and proportional in amplitude to the torsional oscillation of the shaft 2. The amplitude and frequency of the signal 141 may then be read on the cathode ray oscilloscope 140 or by other suitable means. It is of course understood that the switches 78, 86 and 114 are used to obtain the correct integrating and filtering action for the specific range of torsional vibration amplitude and frequency under measurement.

It is to be understood also that although the invention has been described with specific reference to a particular embodiment thereof, it is not to be so limited, since changes and alterations therein may be made which are within the full intended scope of this invention as defined by the appended claims.

I claim:

1. A non-seismic torsiograph including; an electrical signal generating means capable of generating an electrical signal of frequency directly proportional to the angular speed of a rotating body the characteristics of which it is desired to determine, means for generating equal energy unidirectional pulses from said first mentioned signal whose pulse repetition frequency is proportional to said alternating current signal, means for electrically detecting said equal energy pulses to obtain a signal and means to integrate said last mentioned signal to produce a signal proportional in amplitude and equal in frequency to the torsional vibration being measured.

2. A non-seismic torsiograph including, an electrical signal generating means capable of generating an electrical signal of frequency directly proportional to the instantaneous angular velocity of a rotating mass, means for converting said alternating current signal into a square wave of equal frequency, means for differentiating said square wave to produce pulses having a pulse repetition frequency proportional to said alternating current frequency, means for generating equal energy pulses from said first mentioned pulses whose pulse repetition frequency is proportional to said alternating current signal, means for detecting said equal energy pulses to obtain a signal equal in frequency to the torsional vibration being measured and means for integrating this last mentioned signal to produce a signal proportional in amplitude to the amplitude of the torsional oscillation being measured, and measuring means for said last mentioned signal to determine the torsional oscillation amplitude and frequency of said torsional oscillation.

3. In a non-seismic torsiograph including an electrical signal generating means capable of generating an electrical signal of frequency directly proportional to the instantaneous angular velocity of a rotating body, means for generating equal energy, unidirectional pulses from said first mentioned signal whose pulse repetition frequency is proportional to said alternating current signal, means for electrically detecting said equal energy pulses to obtain a signal, amplifying means connected to the detecting means, means to integrate the signal connected to the output of the amplifying means to produce a signal proportional in amplitude and equal in frequency to the torsional vibration being measured and measuring means connected to the integrating means.

LAWRENCE F. HOPE.

REFERENCES CITED

The following references are of record in the file of this patent:

UNITED STATES PATENTS

| Number | Name | Date |
|---|---|---|
| 2,396,540 | Stansfield | Mar. 12, 1946 |
| 2,399,635 | Hope | May 7, 1946 |

FOREIGN PATENTS

| Number | Country | Date |
|---|---|---|
| 617,065 | Great Britain | Feb. 1, 1949 |